J. WARNER.

Support for Upright Standards.

No. 8,010. Reissued Dec. 25, 1877.

Witnesses:

Louis F. Brous,

Jno. P. Grant.

Inventor:

James Warner, by John A. Wiedersheim

Attorney.

UNITED STATES PATENT OFFICE.

JAMES WARNER, OF PHILADELPHIA, PENNSYLVANIA.

IMPROVEMENT IN SUPPORTS FOR UPRIGHT STANDARDS.

Specification forming part of Letters Patent No. 175,844, dated April 11, 1876; Reissue No. 8,010, dated December 25, 1877; application filed November 19, 1877.

*To all whom it may concern:*

Be it known that I, JAMES WARNER, of the city and county of Philadelphia, and State of Pennsylvania, have invented a new and useful Improvement in Supports or Holders for Christmas-Trees, &c., which improvement is fully set forth in the following specification and accompanying drawings, in which—

Figure 1:
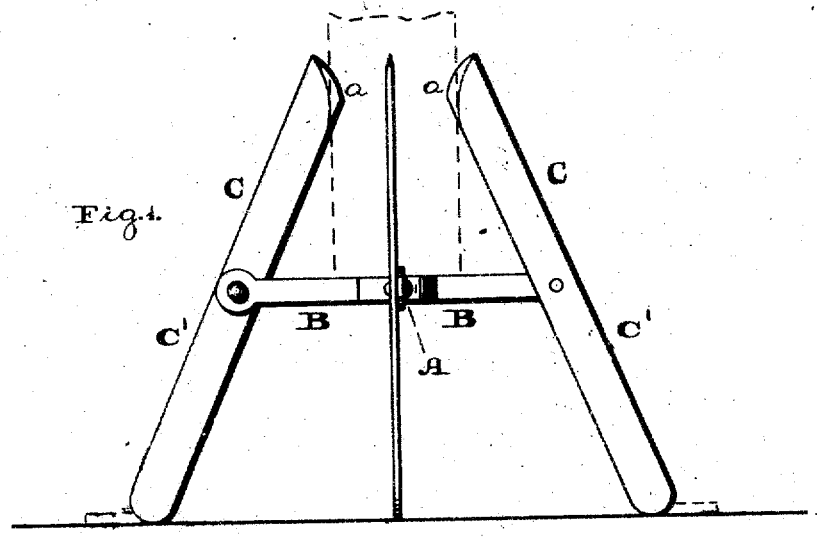
Figure 2:
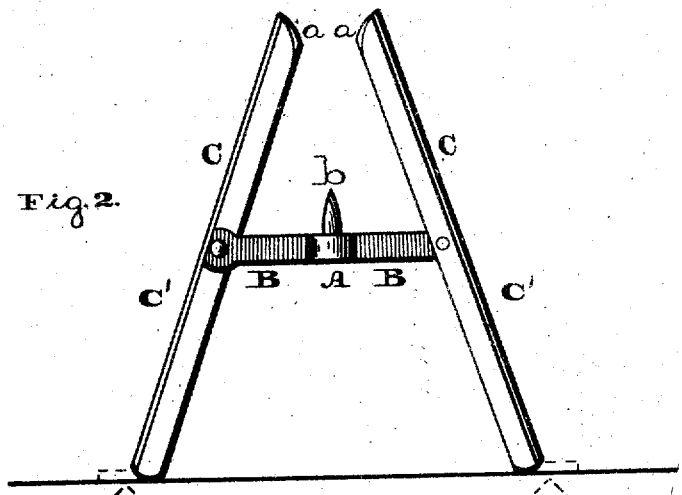
Figure 3:
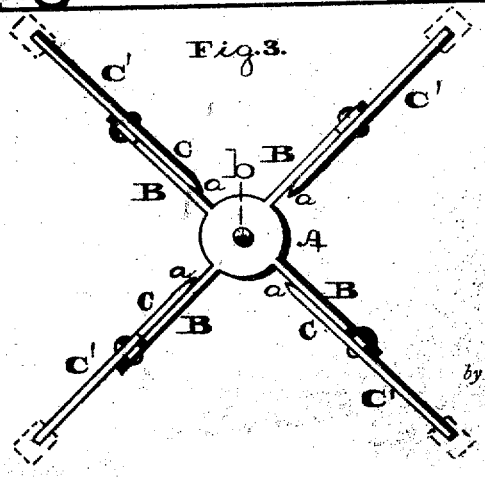

Figures 1 and 2 are side elevations of the support or holder embodying my invention. Fig. 3 is a plan view thereof.

Similar letters of reference indicate corresponding parts in the several figures.

My invention consists of a support for holding and steadily retaining a Christmas-tree or other like object.

Referring to the drawings, A represents a central support, having projecting pieces B, to which are pivoted griping-arms C and supporting-legs C′, the former being extended below to constitute the legs, said arms being adapted to project into the space of the support.

If desired, the upper inner ends of the arms may be sharpened, so as to penetrate or to be driven into the wood, and the support provided with a bottom-piercing prong or stud, *b*; but these are not essential parts.

The arms are separated and the tree is placed on the support A, and while said arms automatically move in against the trunk the legs separate or spread.

It will be seen that the trunk of the tree will be firmly griped and steadied by the griping or inwardly-tightening arms C, the weight of the tree increasing the griping action of said arms, and the tree will not overturn, owing to the wide base of or flaring form assumed by the legs.

The ends *a* of the arms are adapted to trees, &c., of varying thicknesses, and when the support or holder is not required the arms and legs may be readily folded.

Having thus described my invention, what I claim as new, and desire to secure by Letters Patent, is—

1. A holder for Christmas-trees, &c., consisting of a central support, in combination with arms pivoted thereto, which project into the space above the support, and automatically gripe the tree when fitted to the holder, substantially as and for the purpose set forth.

2. A holder for Christmas-trees, &c., consisting of a central support, in combination with arms pivoted thereto, which project into the space above the support, automatically gripe the tree when fitted to the holder, and extend below to form legs, which separate or spread, substantially as and for the purpose set forth.

JAMES WARNER.

Witnesses:

JOHN A. WIEDERSHEIM,

H. E. HINDMARSH